(12) United States Patent
Cotton et al.

(10) Patent No.: US 9,897,287 B1
(45) Date of Patent: Feb. 20, 2018

(54) LIGHT SHIELD STRUCTURE FOR VEHICLE STORAGE COMPARTMENT

(71) Applicant: Calsonic Kansei North America, Inc., Farmington Hills, MI (US)

(72) Inventors: Shermanita Yavette Cotton, Plymouth, MI (US); Lauren Nicole Cotton, Plymouth, MI (US); Bryan Trythall, Carleton, MI (US); Francisco Medina, Wixom, MI (US)

(73) Assignee: CALSONIC KANSEI NORTH AMERICA, INC., Farmington Hills, MI (US)

( * ) Notice: Subject to any disclaimer, the term of this patent is extended or adjusted under 35 U.S.C. 154(b) by 17 days.

(21) Appl. No.: 15/277,782

(22) Filed: Sep. 27, 2016

(51) Int. Cl.
| | |
|---|---|
| *B60Q 1/00* | (2006.01) |
| *F21V 11/00* | (2015.01) |
| *B60R 13/02* | (2006.01) |
| *B60Q 3/02* | (2006.01) |
| *F21V 8/00* | (2006.01) |
| *B60Q 3/00* | (2017.01) |

(52) U.S. Cl.
CPC .............. *F21V 11/00* (2013.01); *B60Q 3/004* (2013.01); *B60Q 3/022* (2013.01); *B60R 13/0256* (2013.01); *G02B 6/0096* (2013.01); *B60R 2013/0287* (2013.01)

(58) Field of Classification Search
USPC ........ 362/511, 487, 488, 491, 546, 368, 370
See application file for complete search history.

(56) References Cited

U.S. PATENT DOCUMENTS

9,124,109 B2  9/2015  Lota et al.

*Primary Examiner* — Vip Patel
(74) *Attorney, Agent, or Firm* — Foley & Lardner LLP (57) ABSTRACT

A finisher for a vehicle console assembly includes a body having an upper surface, a lower surface, and an opening defined therethrough, the opening having a forward end, a rear end, and opposing sides extending therebetween, and a lower light shield extending from the lower surface. The lower light shield includes a canopy having a hood formed at the rear end of the opening, the hood extending away from the lower surface and toward the forward end of the opening. The hood is configured to cover at least a portion of the opening.

23 Claims, 5 Drawing Sheets

FIG. 7

LIGHT SHIELD STRUCTURE FOR VEHICLE STORAGE COMPARTMENT

BACKGROUND

The present application relates generally to the field of structures for controlling the disbursement of light within a vehicle interior. Specifically, the present application relates to light control structures positioned in a vehicle console to prevent or reduce the occurrence of light leakage and glare.

Lights (e.g., incandescent lights, light emitting diodes or LEDs, etc.) may be used in a vehicle to selectively illuminate portions of the vehicle interior. For example, an overhead light may be positioned within the vehicle interior to selectively illuminate a storage area. With such selective illumination, it is desirable that the lighting be directed or controlled in such a way that that it is incident only upon the desired areas or regions within the vehicle interior (i.e., such that other areas which are not intended to be illuminated are not unintentionally illuminated through light leakage, glare, or the like).

It would be advantageous to provide a lighting assembly for an interior space of a vehicle that provided targeted and directed light incidence to selectively illuminate discrete areas or regions of the vehicle interior. It would also be advantageous to provide such a lighting assembly that is relatively simple and cost-effective to implement. These and other advantageous features will become apparent to those reviewing the present disclosure.

SUMMARY

One embodiment relates to a finisher for a vehicle console assembly including a body having an upper surface, a lower surface, and an opening defined therethrough, the opening having a forward end, a rear end, and opposing sides extending therebetween. The finisher further includes a lower light shield extending from the lower surface. The lower light shield includes a canopy having a hood formed at the rear end of the opening, the hood extending away from the lower surface and toward the forward end of the opening. The hood is configured to cover at least a portion of the opening.

Another embodiment relates to a vehicle console assembly including a storage compartment, a console extending from a rear end of the storage compartment, and a finisher extending from a front end of the storage compartment. The finisher includes a body having an upper surface, a lower surface, and an opening defined therethrough, the opening having a forward end, a rear end, and opposing sides extending therebeteween. The finisher further includes a lower light shield extending from the lower surface. The lower light shield includes a canopy having a hood formed at the rear end of the opening, the hood extending away from the lower surface and toward the forward end of the opening. The hood is configured to cover at least a portion of the opening. The console assembly further includes a light assembly received in the opening configured to provide light therethrough to the storage compartment.

Another embodiment relates to a finisher for a vehicle console assembly including a body having an upper surface, a lower surface, and an opening defined through the body, the opening having a forward end, a rear end, and opposing sides extending therebetween. The finisher further includes an upper light shield extending from the upper surface. The upper light shield includes a first side wall extending away from and substantially perpendicular to the upper surface, a second side wall opposing the first side wall, the second side wall extending away from and substantially perpendicular to the upper surface, and a rear wall extending between the first and second side walls. The upper light shield is disposed about the opening.

DETAILED DESCRIPTION

Referring to the FIGURES generally, a console finisher (i.e., cluster panel, structure, cover, plate, finish surface, etc.) is shown according to an exemplary embodiment. The console finisher is a panel installed in a vehicle to cover up structural components, for example, components positioned behind a dashboard. The console finisher may house a light assembly for illuminating storage areas within the vehicle. Various aspects of the console finisher are discussed herein.

Figure 1:
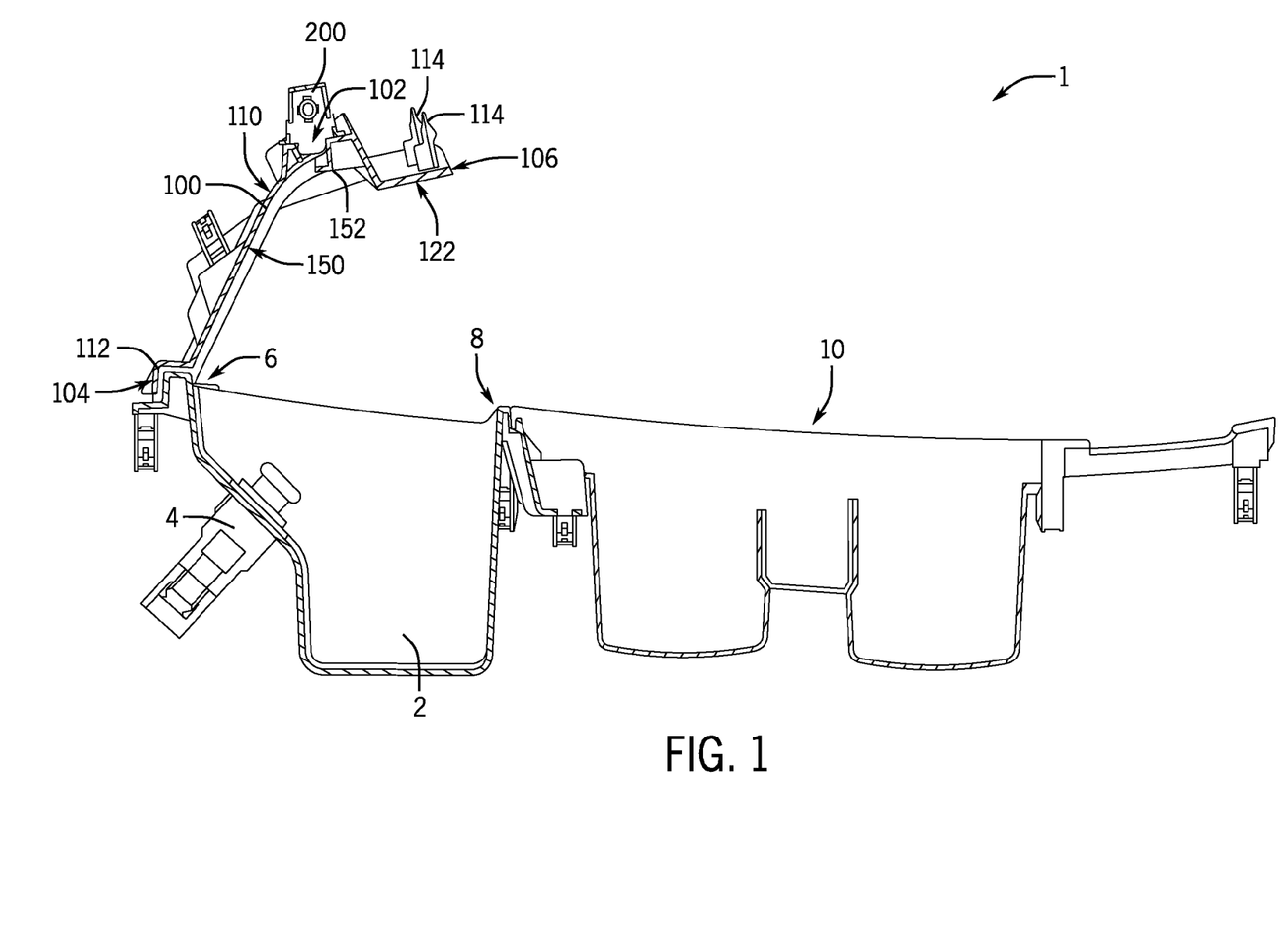
FIG. 1 is a cross-section of a vehicle console, according to an exemplary embodiment.

Referring to FIG. 1, a cross-section of a vehicle console assembly 1 is shown according to an exemplary embodiment. The console assembly 1 includes a storage compartment 2 configured to hold items (e.g., a phone, GPS device, garage opener, etc.) for an occupant of a vehicle. The storage compartment 2 may include at least one accessory 4 (e.g., cigarette lighter, charging port, USB connection, etc.) therein. A console finisher 100 extends upward from a forward end 6 of the storage compartment 2 and toward a rear end 8 thereof, such that an opening 102 defined through the finisher 100 is positioned above the storage compartment 2. A light assembly 200 is coupled to the finisher 100 for supplying light through the opening 102 into the storage compartment 2. A console 10 extends from the rear end 8 of the storage compartment 2 and may support various components (e.g., cup holders, a gear shifter, a drivetrain selector, etc.) within the vehicle.

Figure 2:
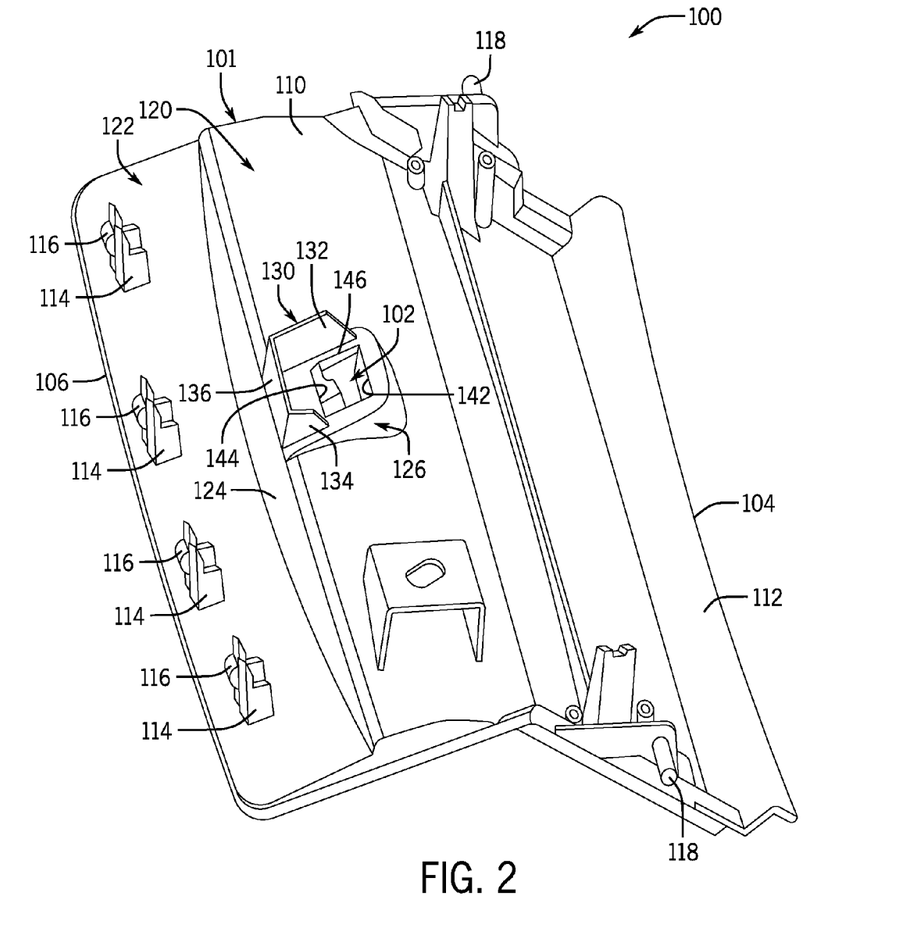
FIG. 2 is a top perspective view of a vehicle console finisher, showing an upper light shield, according to an exemplary embodiment.
Figure 3:
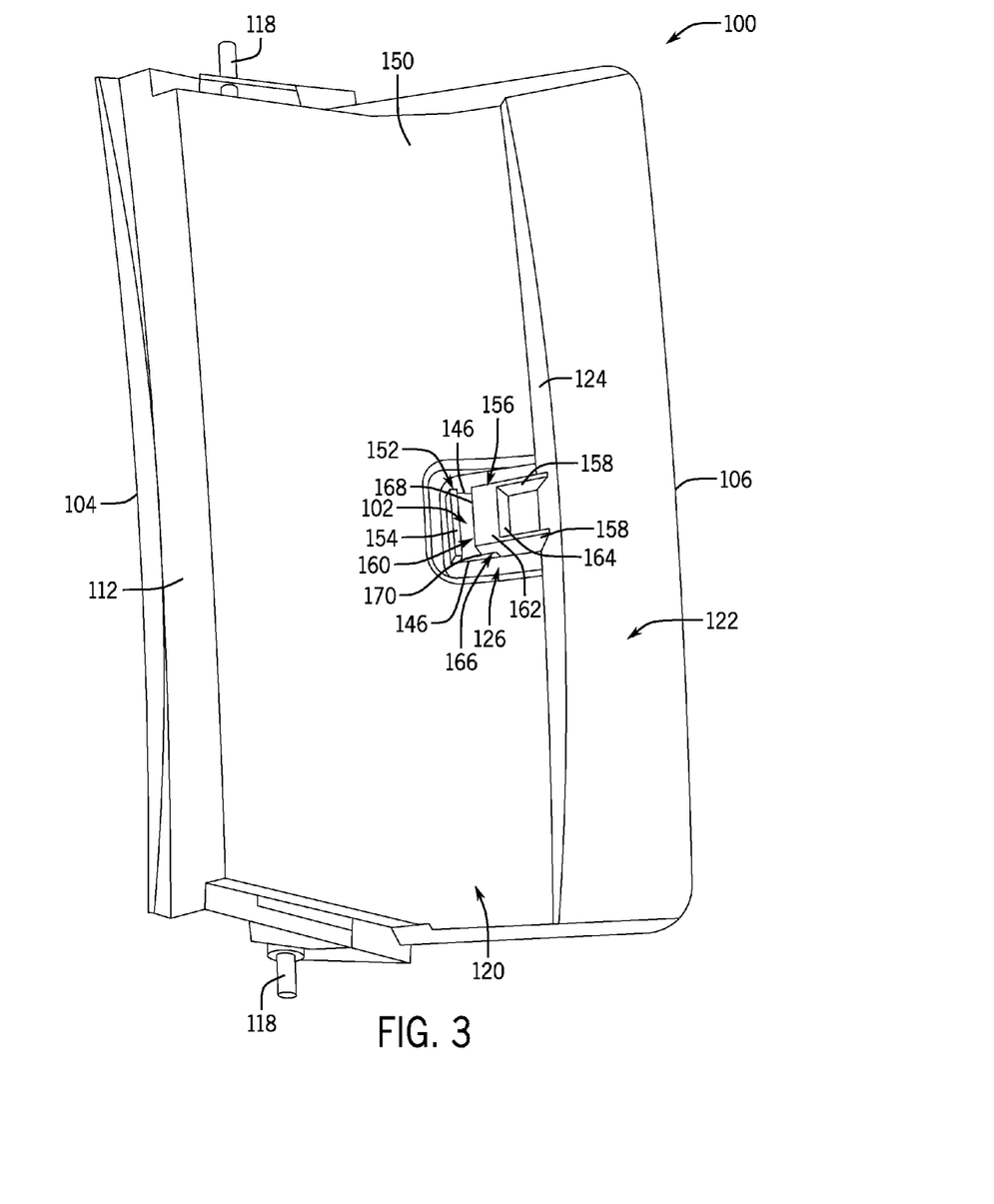
FIG. 3 is a bottom perspective view of the vehicle console finisher of FIG. 2, showing a lower light shield, according to an exemplary embodiment.

Referring now to FIGS. 2 and 3, the finisher 100 is shown according to an exemplary embodiment. The finisher 100 includes a body 101 defining an upper surface 110 and an opposing lower surface 150. When the finisher 100 is installed in a console assembly 1, the upper surface 110 faces generally toward a front end of the vehicle (e.g., the firewall). The finisher 100 encloses the dashboard, concealing components installed therein. The lower surface 150 faces generally toward the passenger compartment of the vehicle, rear of the dashboard, and at least a portion of the lower surface 150 may be visible from within the passenger compartment. The body 101 further defines a front end 104 and an opposing rear end 106. The front end 104 of the body 101 may be coupled to the console assembly 1 proximate the forward end 6 of the storage compartment 2. The rear end 106 of the body 101 may be coupled to another portion of the console assembly 1. According to other exemplary embodiments, the finisher 100 may be coupled to other portions of the console assembly 1 or in other locations in the vehicle, such that the finisher 100 provides light in a desired concentrated location.

Referring to FIGS. 2 and 3, a lip 112 is defined at the front end 104 of the body 101. As shown in FIG. 1, the lip 112 is configured to overlap a raised portion proximate the forward end 6 of the storage compartment. The lip 112 forms a substantially "L" shape, although other shapes may be used according to other exemplary embodiments. The overlap formed by the lip 112 prevents light from leaking into the passenger compartment between the finisher 100 and the storage compartment 2. A plurality of tabs 114 may extend from the upper surface 110 proximate the rear end 106. The tabs 114 are configured to engage a portion of the console assembly 1 for securing the finisher 100 thereto. Each tab 114 includes a flexible catch 116 configured to offset when inserted into a corresponding opening in the console assembly 1 and rebound to form an interference fit therein. While FIG. 2 shows four tabs 114, more or fewer tabs 114 may be used. As shown in FIGS. 2 and 3, a plurality of projections 118 may extend from opposing sides of the finisher 100. Each projection 118 may be configured to be received in a corresponding opening (e.g., hole, groove, slot, etc.) in the console assembly 1 for coupling the finisher 100 thereto. According to an exemplary embodiment, the projections 118 act as locators to locate the finisher 100 relative to the console assembly 1 to simplify manufacture of the console assembly 1. While FIGS. 2 and 3 show two projections 118, more or fewer projections 118 may be used. According to other exemplary embodiments, the finisher 100 may be coupled to the console assembly 1 in other ways (e.g., screw, adhesive, bolt, rivet, etc.).

The body 101 includes a rear portion 122 defined proximate the rear end 106 and a middle portion 120 offset from and raised above the rear portion 122. An offset wall 124 extends between the middle portion 120 and the rear portion 122 of the body 101. The offset wall 124 may extend at an angle between 75 and 105 degrees from each of the middle and rear portions 120, 122. According to an exemplary embodiment, the offset wall 124 is substantially perpendicular to the middle portion 120 and/or the rear portion 122. A height of the offset wall 124 may be configured to conceal at least a portion (e.g., the middle portion 120) of the body 101 from view within the passenger compartment of the vehicle.

As shown in FIGS. 2 and 3, the body 101 defines an inset portion 126 raised above the middle portion 120 in the direction from the second surface 150 to the first surface 110. The inset portion 126 is configured to offset a light assembly 200 from the rear portion 122 of the body 101. The opening 102 is located in the inset portion 126 and is defined by opposing forward and rear ends 142, 144, and opposing sides 146. The opening 102 is configured to pass light from the light assembly 200 on the upper surface 110 of the finisher 100 to the compartment 2 disposed below the lower surface 150. According to other exemplary embodiments, the opening 102 may be defined in other portions of the finisher 100.

Referring to FIG. 2, an upper light shield 130 is shown according to an exemplary embodiment. The upper light shield 130 includes a first side wall 132, an opposing second side wall 134, and a rear wall 136 extending therebetween. Each of the side walls 130, 132 and the rear wall 136 extend from the inset portion 126 of the body 101. The side walls 132, 134 may extend substantially perpendicular to and away from the upper surface 110 and the rear wall 136 may extend substantially coplanar with or parallel to the offset wall 124. According to other exemplary embodiments, the side walls 132, 134 and the rear wall 136 may extend from the inset portion 126 in other directions. The side walls 130, 132 are located on opposing sides of the opening 102 and the rear wall 134 is located rearward (i.e., toward the rear end 106) of the opening 102. In this configuration, the upper light shield 130 surrounds (i.e., is disposed about) the opening 102 on at least three sides thereof. According to other exemplary embodiments, the side walls 130, 132 and rear wall 134 may extend from other portions of the upper surface 110, such that the upper light shield 130 surrounds the opening 102.

Figure 4:
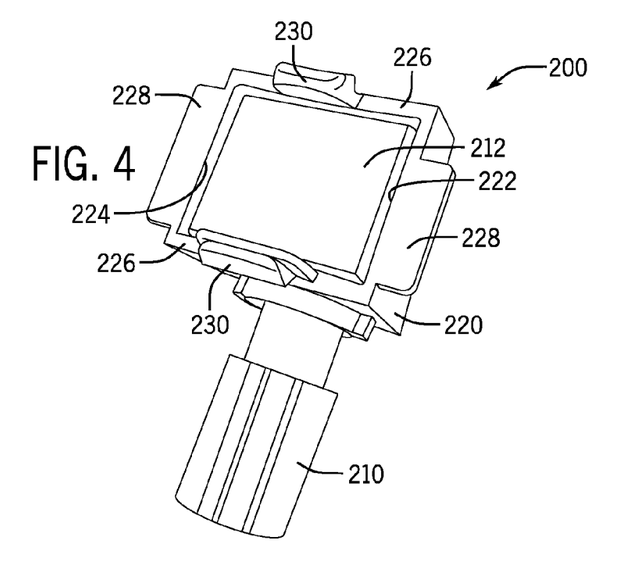
FIG. 4 is a perspective view of a light assembly, according to an exemplary embodiment.
Figure 5:
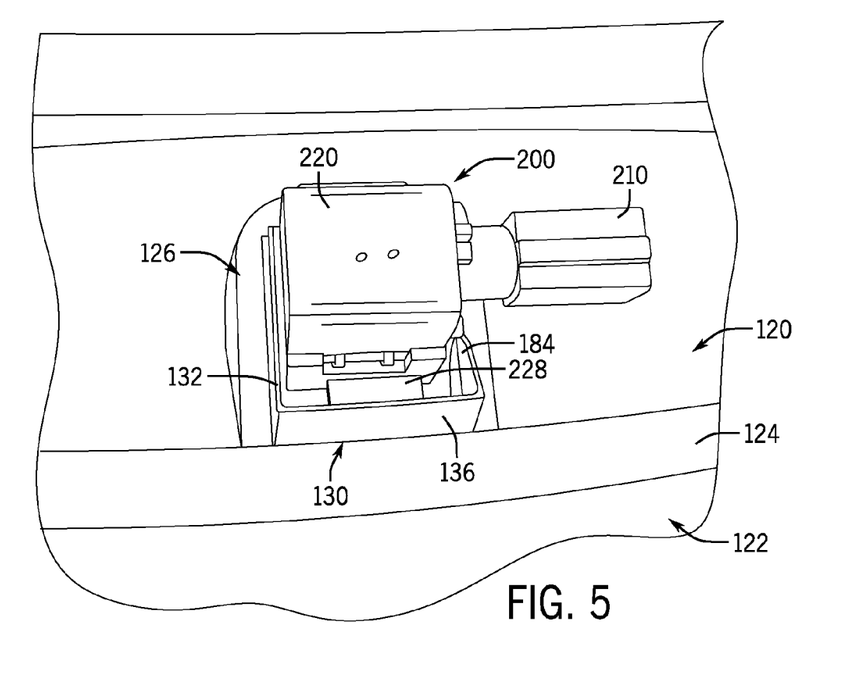
FIG. 5 shows the light assembly installed in the vehicle console finisher, according to an exemplary embodiment.

Referring to FIG. 4, the light assembly 200 is shown according to an exemplary embodiment. The light assembly 200 includes a lightbulb 210, a light pipe 212, and a body 220. The lightbulb 210 may be an LED, halogen, or other source of light configured to provide light to the light assembly 200. The lightbulb 210 is configured to be coupled to the body 220 such that at least a portion of the lightbulb 210 is received within the body 220. The light pipe 212 is formed from a semi-opaque material configured to reflect light from the lightbulb 210 into the storage compartment 2, below. Each of the body 220 and the light pipe 212 are substantially rectangular and sized such that the body 220 may house the light pipe 212 therein. According to other exemplary embodiments, the light pipe 212 and the body 220 may form other complementary shapes.

The body 220 of the light assembly 200 defines a forward end 222 and a rear end 224 and opposing sides 226 extending therebetween. A tab 228 extends from each of the ends 222, 224, away from and substantially perpendicular to the body 220. Each of the tabs 228 is substantially coplanar with and/or parallel to a bottom surface of the light pipe 212. The tabs 228 are configured to extend far enough from the body 220, such that when the light assembly 200 is positioned within the opening 102, the tabs 228 span wider than the opening 102 and engage the upper surface 110, preventing the body 220 from passing through the opening 102. When the light assembly 200 is installed in the opening 102, the tabs 228 cover at least a portion of the opening 102, such that at least some leakage of light through the opening 102 is prevented by such overlap.

Figure 7:
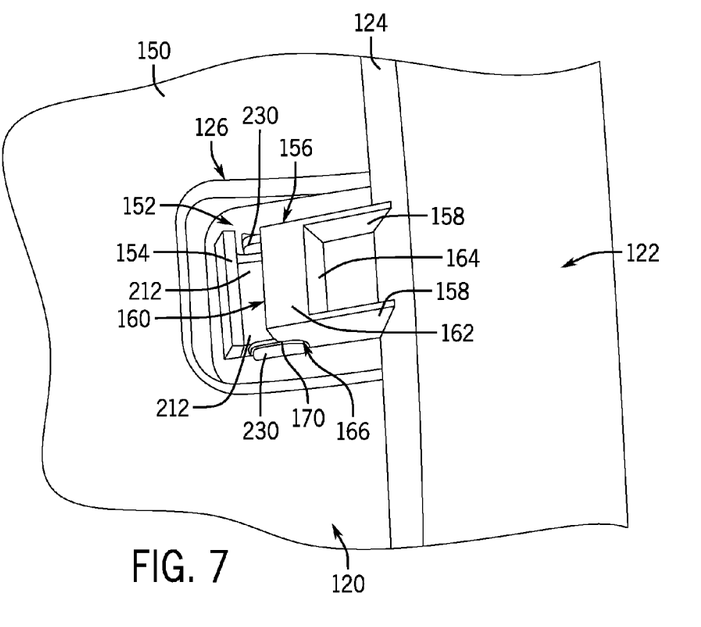
FIG. 7 is a bottom perspective view of the installation shown in FIG. 5.

A catch 230 extends from each of the sides 226, away from and substantially coplanar with or parallel to the body 220. Each of the catches 230 is substantially perpendicular to the bottom surface of the light pipe. The catches 230 are configured to engage the sides 146 of the opening 102 with an interference fit, removably coupling the light assembly 200 to the finisher 100, as shown in FIG. 7. For example, the catches 230 may selectively engage the lower surface 110, preventing the light assembly 200 from being withdrawn from the opening 102. When the light assembly 200 is installed in the opening 102, the catches 230 are deflected (e.g., through plastic deformation) toward each other by engagement with the sides 146 of the opening 102, such that the catches 230 are received in the opening 102, which has a smaller width than a width of the catches 230 when they are not deflected. Once the tabs 228 engage the upper surface 110 and the light assembly 200 is fully received in the opening 102, the catches 230 return to their original (i.e., non-deflected) orientation. The catches 230 are configured to prevent light from passing between the body 210 and the sides 146 of the opening 102.

The first side wall 132 and the second side wall 134 may have different lengths. For example, the second side wall 134 may be shorter than the first side wall 132 to accommodate the lightbulb 210 extending from the light assembly 200. In this configuration, the first side wall 132 may extend from the rear wall 136 at least as far as the forward end 142 of the opening 102. According to an exemplary embodiment, the first side wall 132 extends further forward (i.e., toward the front end 104) of the forward end 142 of the opening 102. While FIG. 2 shows the upper light shield 130 having three walls, the upper light shield 130 may include more or fewer walls. For example, the opening 102 may be surrounded by walls on all four sides. In this configuration, a front wall (not shown) may extend substantially parallel to the rear wall 136 on an opposing side (e.g., proximate the forward end 142) of the opening 102. According to another exemplary embodiment, a third side wall (not shown) may extend substantially coplanar with or parallel to the second side wall 134, spaced apart from the second side wall 134 to accommodate the lightbulb 210 disposed therebetween. The third side wall may extend as far as the first side wall 132 relative to the forward end 142 of the opening 102.

Figure 6:
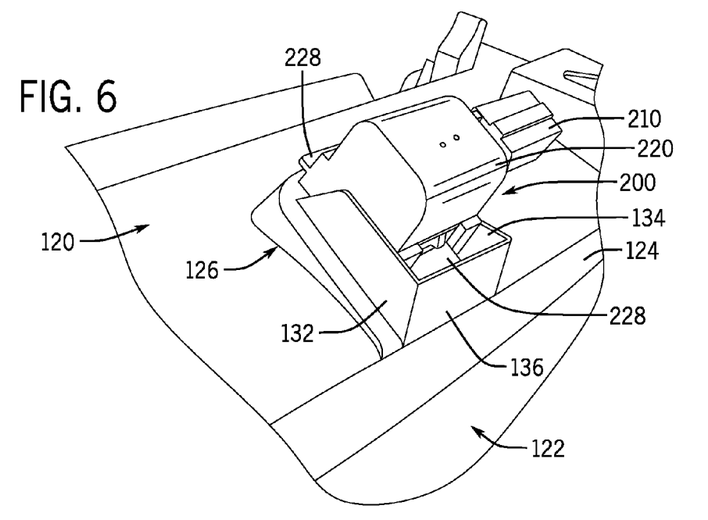
FIG. 6 is a perspective view of the installation shown in FIG. 5.

Referring to FIG. 6, the upper light shield 130 is shown overlapping the body 220 of the light assembly 200. In this configuration, a height of each of the side walls 132, 134 and rear wall 136 is configured to prevent at least a portion of light from leaking into the space above the upper surface 110 of the finisher 100. For example, the side walls 132, 134 of the upper light shield 130 extend away from the upper surface 110 proximate to the sides 226 of the body 220. In this configuration, as light leaks from the light assembly 200 on the sides 226 of the body 220, the light is blocked by the side walls 132, 134 before it can be disbursed into the space above the upper surface 110 and through panel gaps into the passenger compartment. The rear wall 136 may overlap the rear end 224 of the body 220 in a similar way to the side walls 132, 134. For example, as light leaks from the rear end 224 of the body 220, the light is blocked by the rear wall 136 before it can be disbursed into the space above the upper surface 110.

Referring now to FIGS. 2 and 7, a lower light shield 152 is shown according to an exemplary embodiment. The lower light shield 152 is located in the inset portion 126 of the body 101 and is configured to restrict the direction of light reflection from the opening 102. For example, without the lower light shield 152, light from the light pipe 212 may be reflected onto surfaces within the vehicle that are undesirable (e.g., the console 10). As shown in FIG. 7, the light pipe 212 is disposed in the opening 102 and at least partially obscured (i.e., concealed, covered, etc.) by the lower light shield 152. The lower light shield 152 prevents light from illuminating surfaces of the console assembly 1 outside of the storage compartment 2.

The lower light shield 152 includes a forward wall 154 and a canopy 156. The forward wall 154 extends from the lower surface 150 at the forward end 142 of the opening 102. The forward wall 154 may extend at an angle from the lower surface 150. For example, the forward wall 154 may extend toward the canopy 156 disposed at the rear end 144 of the opening 102. In this configuration, the forward wall 154 at least partially obscures the light pipe 212. According to an exemplary embodiment, the forward wall 154 has a width substantially the same as or greater than a width of the opening 102. The forward wall 154 is disposed between the light assembly 200 and the front end 104 of the body and is configured to block light from reflecting onto a portion of the lower surface 150 as well as from the lower surface 110 onto other surfaces in the passenger compartment.

Still referring to FIG. 7, the canopy 156 is shown according to an exemplary embodiment. The canopy 156 includes at least two opposing ribs 158 extending from and substantially perpendicular to the lower surface 110 at the inset portion 126. The ribs 158 form opposing sides of the canopy 156 such that a width of the canopy 156 may be defined by the distance between the ribs 158. According to an exemplary embodiment, the width of the canopy 156 is substantially the same as or greater than the width of the opening 102. For example, the canopy 156 may have the same width as the forward wall 154. Each of the ribs 158 extends from the offset wall 124 toward the forward wall 154 of the lower light shield 152. In this configuration, the ribs 158 provide structural rigidity to the canopy 156, such that the canopy 156 is not damaged during manufacturing or installation in the console assembly 1. The ribs 158 further simplify the process for manufacturing the finisher 100. For example, the finisher 100 may be formed (e.g., injection molded) from plastic. During molding, the ribs 158 are formed by a space in a mold configured to allow transfer of liquid acrylic (or other material) between the offset wall 124 and the rest of the canopy 156. According to other exemplary embodiments, the finisher 100 may be formed in other ways or from other materials.

The canopy 156 further includes a hood 160, which extends laterally between the ribs 158 and is configured to at least partially obscure the light pipe 212. For example, the ribs 158 may form sides of the hood 160. As shown in FIG. 7, the hood 160 includes a base portion 162 and a riser portion 164. The base portion 162 is substantially parallel to and offset from the lower surface 110 at the inset portion 126 and/or the light pipe 212 when the light assembly 200 is installed in the opening 102. The base portion 162 may extend over the opening 102, such that a front end 168 of the hood 160 is positioned substantially halfway or more than halfway from the forward end 142 to the rear end 144 of the opening 102. According to an exemplary embodiment, the base portion 162 may extend over at least half of the light pipe 212. In this configuration, the base portion 162 of the hood 160 is configured to block at least some light from passing downward into the storage compartment 2. For example, the hood 160 (e.g., the base portion 162) is disposed between the light assembly 200 and the console 10 and may be configured to block light from reflecting off of the console 10 or a rear end 8 of the storage compartment 2. According to an exemplary embodiment, the leakage of light toward the rear end 106 of the finisher 100 is either reduce or eliminated without extension of the riser portion 164, such that the base portion 162 and the riser portion 164 are concealed from view within the passenger compartment of the vehicle.

The riser portion 164 of the hood 160 extends between and substantially perpendicular to the lower surface 110 in the inset portion 126 and the base portion 162 of the hood 160. The riser portion 164 is configured to block light from passing from the light pipe 212 toward the rear end 106 of the finisher 100 and into the passenger compartment (e.g., reflecting off of the console 10). According to another exemplary embodiment, the riser portion 164 of the hood 160 blocks light from reflecting off of the offset wall 124 and toward a front end 104 of the finisher 100 or into the forward end 6 of the storage compartment 2 that may be undesirable to illuminate. According to an exemplary embodiment, the base portion 162 and the riser portion 164 are formed as a single structure, such that no space is provided therebetween. In this configuration, leakage of light toward the rear end 106 of the finisher 100 is either reduced or eliminated.

A slot 166 configured to receive a catch 230 is defined in each rib 158. The slot 166 extends from the rear end 144 of the opening 102 toward the front end 168 of the hood 162. In this configuration, the light assembly 200 can be installed in the opening 102 with an interference fit and the canopy 156 may extend at least partway across the light pipe 212. As shown in FIG. 7, the slot 166 forms an arcuate shape, although the slot 166 may include other shapes. For example, the shape of the slot 166 may be configured to reduce any gaps between the ribs 158 and the catches 230. The catches 230 may extend substantially to a forward end 170 of each slot 166, preventing leakage of light between the ribs 158 and the catches 230.

As discussed above, the offset wall 124 is configured to conceal at least a portion of the lower light shield 152. A height of the offset wall 124 may be greater than a height of the canopy 156 (e.g., a height of the ribs 158). For example, as shown in FIG. 1, when the finisher 100 is installed in the console assembly 1, the hood 160 forming the lowest part of the lower light shield 152 is located above the rear portion 122 of the finisher 100. According to another exemplary embodiment, the lower light shield 152 may be concealed from view by the rear portion 122 of the finisher 100 by further raising the inset portion 126 relative to the rear portion 122. In either configuration, an occupant in the vehicle viewing from a perspective level with or above the rear portion 122 of the finisher would not be able to see the lower light shield 152, but would be able to see the light directed by the lower light shield 152 illuminating the storage compartment 2. By obscuring the lower light shield 152 from view, this configuration provides an aesthetically desirable console assembly 1 to the occupant.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of this disclosure as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the position of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is to be understood that although the present invention has been described with regard to preferred embodiments thereof, various other embodiments and variants may occur to those skilled in the art, which are within the scope and spirit of the invention, and such other embodiments and variants are intended to be covered by corresponding claims. Those skilled in the art will readily appreciate that many modifications are possible (e.g., variations in sizes, dimensions, structures, shapes and proportions of the various elements, mounting arrangements, use of materials, orientations, manufacturing processes, etc.) without materially departing from the novel teachings and advantages of the subject matter described herein. For example, the order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

What is claimed is:

1. A finisher for a vehicle console assembly comprising:
   a body having an upper surface, a lower surface, and an opening defined therethrough, wherein the opening comprises a forward end, a rear end, and opposing sides extending therebetween; and
   a lower light shield extending from the lower surface, the lower light shield comprising:
      a canopy having a hood formed at the rear end of the opening, the hood extending away from the lower surface and toward the forward end of the opening;
      wherein the hood is configured to cover at least a portion of the opening.

2. The finisher of claim 1, wherein:
   the lower light shield further comprises a forward wall formed at the forward end of the opening, the forward wall extending away from the lower surface and toward the rear end of the opening; and
   wherein the forward wall is configured to cover at least a portion of the opening.

3. The finisher of claim 1, wherein the opening is defined in an inset portion raised above the upper surface and the lower light shield is disposed in the inset portion.

4. The finisher of claim 3, wherein:
   the body defines a middle portion, a rear portion, and an offset wall extending therebetween;
   the offset wall is substantially perpendicular to each of the middle portion and the rear portion; and
   the inset portion is defined in the middle portion.

5. The finisher of claim 4, wherein a height of the offset wall is greater than a height of the lower light shield, such that the lower light shield is configured to be at least partially concealed from view within a passenger compartment when the finisher is installed therein.

6. The finisher of claim 4, wherein the canopy further comprises at least one rib extending between the hood and the offset wall, and wherein the at least one rib extends from and is substantially perpendicular to the lower surface.

7. The finisher of claim 1, further comprising a light assembly received in the opening, the light assembly comprising:

a lightbulb;
a body having a forward end, a rear end, and opposing sides extending therebetween;
a catch extending from each of the sides; and
a light pipe disposed in the body.

8. The finisher of claim 7, wherein a tab extends from each of the forward end and the rear end of the body of the light assembly, and wherein the tabs engage the upper surface to prevent the light assembly from passing through the opening.

9. The finisher of claim 8, wherein when the tabs are configured to prevent light from passing between the light assembly and the forward and rear ends of the opening.

10. The finisher of claim 7, wherein the catches are configured to engage the sides of the opening with an interference fit and are configured to selectively engage the lower surface.

11. The finisher of claim 10, wherein the opening is surrounded with the bhood, the forward wall, and the catches to guide light from the light assembly.

12. The finisher of claim 7, further comprising at least two ribs forming opposing sides of the hood and a slot defined in each of the ribs, the slots extending from the rear end of the opening toward a front end of the hood;
wherein each slot is configured to receive a catch therein.

13. A vehicle console assembly comprising:
a storage compartment;
a console extending from a rear end of the storage compartment; and
a finisher extending from a front end of the storage compartment, the finisher comprising:
  a body having an upper surface, a lower surface, and an opening defined therethrough, the opening having a forward end, a rear end, and opposing sides extending therebetween; and
  a lower light shield extending from the lower surface, the lower light shield comprising:
    a canopy having a hood formed at the rear end of the opening, the hood extending away from the lower surface and toward the forward end of the opening;
    wherein the hood is configured to cover at least a portion of the opening; and
  a light assembly received in the opening configured to provide light therethrough to the storage compartment.

14. The finisher of claim 13, wherein:
the lower light shield further comprises a forward wall formed at the forward end of the opening, the forward wall extending away from the lower surface and toward the rear end of the opening; and
wherein the forward wall is configured to cover at least a portion of the opening.

15. The assembly of claim 13, wherein the opening is defined in an inset portion raised above the upper surface, the inset portion configured to conceal the light assembly from view within a passenger compartment.

16. The finisher of claim 7, wherein the hood is disposed between the light assembly and the console, such that the hood is configured to prevent light from reflecting onto the console.

17. The finisher of claim 7, wherein the forward wall is disposed between the light assembly and a forward end of the body, such that the forward wall is configured to prevent light from reflecting onto the lower surface of the finisher proximate the front end thereof.

18. A finisher for a vehicle console assembly comprising:
a body having an upper surface, a lower surface, and an opening defined through the body, the opening having a forward end, a rear end, and opposing sides extending therebetween;
an upper light shield extending from the upper surface, the upper light shield comprising:
  a first side wall extending away from and substantially perpendicular to the upper surface;
  a second side wall opposing the first side wall, the second side wall extending away from and substantially perpendicular to the upper surface; and
  a rear wall extending between the first and second side walls;
wherein the upper light shield is disposed about the opening.

19. The finisher of claim 18 further comprising a light assembly received in the opening, the light assembly comprising:
a lightbulb;
a body having a forward end, a rear end, and opposing sides extending therebetween;
a catch extending from each of the sides; and
a light pipe disposed in the body.

20. The finisher of claim 19, wherein:
the upper light shield is configured to surround the light assembly on at least three sides thereof;
each of the first and second side walls are configured to prevent light from leaking from the sides of the opening; and
the rear wall is configured to prevent light from leaking from the rear end of the opening.

21. The finisher of claim 19, wherein a tab extends from each of the forward end and the rear end of the body of the light assembly; and wherein the tabs engage the upper surface to prevent the light assembly from passing through the opening.

22. The finisher of claim 19, wherein the tabs are configured to prevent light from passing between the light assembly and the forward and rear ends of the opening.

23. The finisher of claim 19, wherein the catches are configured to engage the sides of the opening with an interference fit and are configured to selectively engage the lower surface.

* * * * *